(12) United States Patent  (10) Patent No.: US 8,885,540 B2
Robertson et al.  (45) Date of Patent: *Nov. 11, 2014

(54) TELECOMMUNICATIONS SYSTEM AND METHOD

(75) Inventors: Robert Robertson, Maidenhead (GB); Andrew Lewis, Basingstoke (GB)

(73) Assignee: Multitone Electronics PLC, Hampshire (GB)

( * ) Notice: Subject to any disclaimer, the term of this patent is extended or adjusted under 35 U.S.C. 154(b) by 1365 days.

This patent is subject to a terminal disclaimer.

(21) Appl. No.: 12/373,043

(22) PCT Filed: Jul. 13, 2007

(86) PCT No.: PCT/GB2007/002663
§ 371 (c)(1),
(2), (4) Date: Jun. 16, 2009

(87) PCT Pub. No.: WO2008/007129
PCT Pub. Date: Jan. 17, 2008

(65) Prior Publication Data
US 2010/0034132 A1  Feb. 11, 2010

(30) Foreign Application Priority Data

Jul. 14, 2006 (GB) .................................. 0614074.3
May 16, 2007 (GB) .................................. 0709428.7

(51) Int. Cl.
*H04B 7/14* (2006.01)
(Continued)

(52) U.S. Cl.
CPC ............. *H04B 7/2656* (2013.01); *H04W 48/12* (2013.01); *H04W 52/46* (2013.01); *H04W 16/26* (2013.01); *H04B 7/155* (2013.01); *Y02B 60/50* (2013.01); *H04B 7/2606* (2013.01); *H04W 52/325* (2013.01)

USPC ............................ 370/315; 370/501; 370/458

(58) Field of Classification Search
USPC .......................................................... 370/315
See application file for complete search history.

(56) References Cited

U.S. PATENT DOCUMENTS 5,034,945 A   7/1991 Kimoto et al.
5,179,559 A *  1/1993 Crisler et al. ................. 370/332
(Continued)

FOREIGN PATENT DOCUMENTS

EP   497490 A2  1/1992
EP   0497490 A2  1/1992
(Continued)

OTHER PUBLICATIONS

Network Management System for Telecommunication and Internet Application, Author: Gerd Bumiller, Published: May 2003 http://web.archive.org/web/20030520124947/http://iad-de.com/plcsym/dlc3nmspaper01.pdf.*

*Primary Examiner* — Noel Beharry
(74) *Attorney, Agent, or Firm* — Haverstock & Owens LLP

(57) ABSTRACT

A telecommunications system for communicating data to and from a mobile device. The system comprises a plurality of repeater nodes disposed to form a network. Each repeater, node has a transceiver unit operable to transmit the data with a first transmission power to one or more other of the repeater nodes within one of a plurality of slots of a time frame. Each repeater node is allocated a time slot, and the mobile device is arranged to transmit and receive data to and from the repeater nodes in the network. Each of the repeater nodes is operable to transmit a pilot signal during the same one of the time slots of the time frame with a second transmission power, the second power being less than the first transmission power. The pilot signal includes an identifier of the repeater node which is transmitted with the pilot signal and the mobile device is operable to receive one of the pilot signals.

23 Claims, 12 Drawing Sheets

(51) Int. Cl.
*H04J 1/10* (2006.01)
*H04J 3/08* (2006.01)
*H04L 12/43* (2006.01)
*H04W 52/46* (2009.01)
*H04B 7/155* (2006.01)
*H04B 7/26* (2006.01)
*H04W 52/32* (2009.01)
*H04W 48/12* (2009.01)
*H04W 16/26* (2009.01)

(56) References Cited

U.S. PATENT DOCUMENTS

| | | | |
|---|---|---|---|
| 5,263,177 A | | 11/1993 | Schieve et al. |
| 5,392,287 A | * | 2/1995 | Tiedemann et al. ......... 370/311 |
| 6,396,824 B1 | | 5/2002 | Schilling |
| 6,415,155 B1 | * | 7/2002 | Koshima et al. ............ 455/456.1 |
| 7,099,384 B1 | * | 8/2006 | Jalali et al. ..................... 375/229 |
| 7,283,787 B2 | * | 10/2007 | Diao et al. .................... 455/11.1 |
| 7,577,398 B2 | * | 8/2009 | Judd et al. .................... 455/11.1 |
| 2003/0157943 A1 | * | 8/2003 | Sabat, Jr. ......................... 455/456 |
| 2004/0165657 A1 | * | 8/2004 | Simic et al. ..................... 375/211 |

FOREIGN PATENT DOCUMENTS

| | | |
|---|---|---|
| WO | 9519688 A | 7/1995 |
| WO | 9519688 A1 | 7/1995 |
| WO | 03027703 A2 | 3/2002 |
| WO | 03065757 A1 | 1/2003 |
| WO | 03027703 A2 | 4/2003 |
| WO | 03065757 A1 | 8/2003 |
| WO | 03073643 A1 | 9/2003 |
| WO | 2004095733 A2 | 11/2004 |
| WO | 2006069859 A1 | 7/2006 |

* cited by examiner

TELECOMMUNICATIONS SYSTEM AND METHOD

FIELD OF THE INVENTION

The present invention relates to a system and method for communicating data to and from a mobile device via a plurality of repeater nodes.

BACKGROUND OF THE INVENTION

Use of repeater nodes in telecommunication networks is well known. Typically the repeater nodes are stationed between a source node and a destination node to allow for data communicated from the source node to be communicated to the destination node over a distance that would otherwise be too great to maintain an acceptable signal quality if communication was made without the repeater nodes. A first repeater node conventionally receives the data being transmitted from the source node, performs any amplification which may be necessary due to a degradation of the signal and transmits the amplified signal on to a second repeater node. The second repeater node in turn performs any amplification which may be necessary due to a degradation of the signal, transmit the amplified signal on to the next repeater node. This process will be repeated until a final repeater node transmits the data to the destination node. An advantage of systems that communicate data via repeater nodes is that a distance across which the source node and destination node can communicate can be increased beyond a distance that the source node and destination node would otherwise be able to communicate without the repeater nodes. Also a transmission method used by the repeater nodes for example a radio interface, need only have a maximum range of a distance between each of the repeater nodes. This allows for the use of transmission methods such as short range radio interfaces, for example Bluetooth, which may be particularly desirable because of low power consumption and minimal radio interference impact.

The use of repeater nodes is common in so-called ad-hoc networks in which a number of repeater nodes may form a network in which no formal network planning is required. Ad-hoc networks often allow the network to "self organise" to some degree. This self organisation may be such that repeater nodes within the network can be removed, added or change location whilst still allowing communication of data between the source node and the destination node.

However, because ad-hoc networks include little or no formal planning it can be difficult to determine a location of a node within the network.

SUMMARY OF THE INVENTION

According to the present invention there is provided a telecommunications system for communicating data to and from a mobile device. The system comprises a plurality of repeater nodes disposed to form a network. The mobile device is provided with a transceiver unit with which to transmit and receive data. Each repeater node has a transceiver unit with which to transmit and receive data. Each repeater unit is operable to transmit the data with a first transmission power to one or more others of the repeater nodes within one of a plurality of slots of a time frame. Each repeater node is allocated one of the time slots of the time frame and the mobile device is arranged to transmit and receive data to and from one or more of the repeater nodes in the network in one of the time slots of the time frame. Each of the repeater nodes is operable to transmit a pilot signal during the same one of the time slots of the time frame with a second transmission power, the second power being less than the first transmission power. The pilot signal includes an identifier of the repeater node which is transmitted with the pilot signal.

Embodiments of the present invention provide an arrangement in which each repeater node transmits a pilot signal during a specified pilot signal time slot of the time frame at a reduced power compared to the power with which each repeater node transmits data. Because the repeater nodes transmit the pilot signal at a reduced power, a coverage area provided by each repeater node is reduced and the mobile device is able to more clearly determine the proximity of nearby repeater nodes because the mobile device will only receive pilot signals from repeater nodes that are within a communication range of the reduced power pilot signal. When transmitting the pilot signal, each repeater node includes an identifier of the repeater node. Thus information regarding the location of the mobile device relative to the repeater nodes can be established.

Because the pilot signal is transmitted by each repeater node at the same time and at a reduced power, the present invention is afforded a number of advantages. Unlike known arrangements there is no requirement for a continuous pilot signal to be broadcast from each repeater node on a different radio channel to the main data bearing channel. As a result there can be a reduction in the power consumption of the repeater nodes. Furthermore the repeater nodes do not need additional radio equipment to provide the pilot signal beyond that required to receive send and receive data in a similar way to normal message transmissions such as those known for sending text messages to pager type devices. In some embodiments, a common radio channel is used for both location and normal message communication purposes, therefore as only one radio channel need be used for the entire system, this can reduce the complexity and cost of transceiver units in the repeater nodes and the mobile device and further mitigate the effects of radio interference caused by the network. Additionally the power consumption of the mobile device may be reduced because the mobile device need not continuously monitor a separate pilot signal channel for each repeater node.

In some embodiments of the present invention, along with the identifier, each repeater node is operable to include information indicating the time slot of the time frame during which the repeater node transmits data. In this way, once the mobile device has determined which repeater node is transmitting the strongest pilot signal, the mobile device is able to identify the time period to receive the data corresponding to the data transmitting time slot of the selected repeater node. This can also reduce the power consumption of the mobile device, because the mobile device need only energise a receiver during a specific time slot. In other words as each repeater node transmits its pilot signal within the same time slot, the mobile device need only be in a pilot signal receiving mode for the time period during which the pilot signals are transmitted, i.e. that of a single time slot.

In some embodiments the second transmission power is sufficient to assure that the mobile device can receive the pilot signal from at least one of the repeater nodes when operating within the network. The mobile device is thus operable to use the pilot signal to assist in handing over from one repeater node to another. Based on the received pilot signals the mobile device is operable to determine a suitable repeater node with which it shares a good quality radio link and based on the identifier received with the pilot signal designate that repeater node as a repeater node with which to communicate upstream and downstream data. If the mobile device moves around the network any received pilot signals are used to enable the mobile device to handover from one repeater node to another. This can be an advantage because the mobile device need only transmit data at a power sufficient to reach the designated repeater node. Furthermore, as the mobile device only transmits upstream data to the designated repeater node, this means that the upstream data transmitted by the mobile device will only be received and propagated up through the network by the designated repeater node.

In one embodiment the pilot signal is transmitted with a third transmission power, the third transmission power being less than the second transmission power and reduced to the effect that the pilot signal can only be received by the mobile device when in the vicinity of one of the repeater nodes. In this embodiment, the repeater nodes are operable to use the pilot signal as a location pilot signal. The pilot signal is transmitted at a further reduced power which is typically less than the power of the pilot signal used for the handover pilot signal. The power of this location pilot signal is such that it will only be received by a mobile device if the mobile device is within the proximity of the repeater node which has transmitted the location pilot signal. In some embodiments each repeater node will be associated with a certain area and therefore if a mobile device receives a location pilot signal, it can be determined that the mobile device is within the area associated with the repeater node that has sent the received location pilot signal.

As the time frame is synchronised and regularly repeated, the mobile device need only receive any location pilot signal once to synchronise to the time frame and determine when to enable its receiver for a brief period in order to receive the location pilot signal from any repeater node within range Transmission of simultaneous location pilot signals from all repeater nodes therefore reduce the load of a battery of the mobile device. Similarly, as the location pilot signal is only transmitted for a brief period and at low radio power level, it makes minimal loading demands on the repeater node power source which in some cases may be battery.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
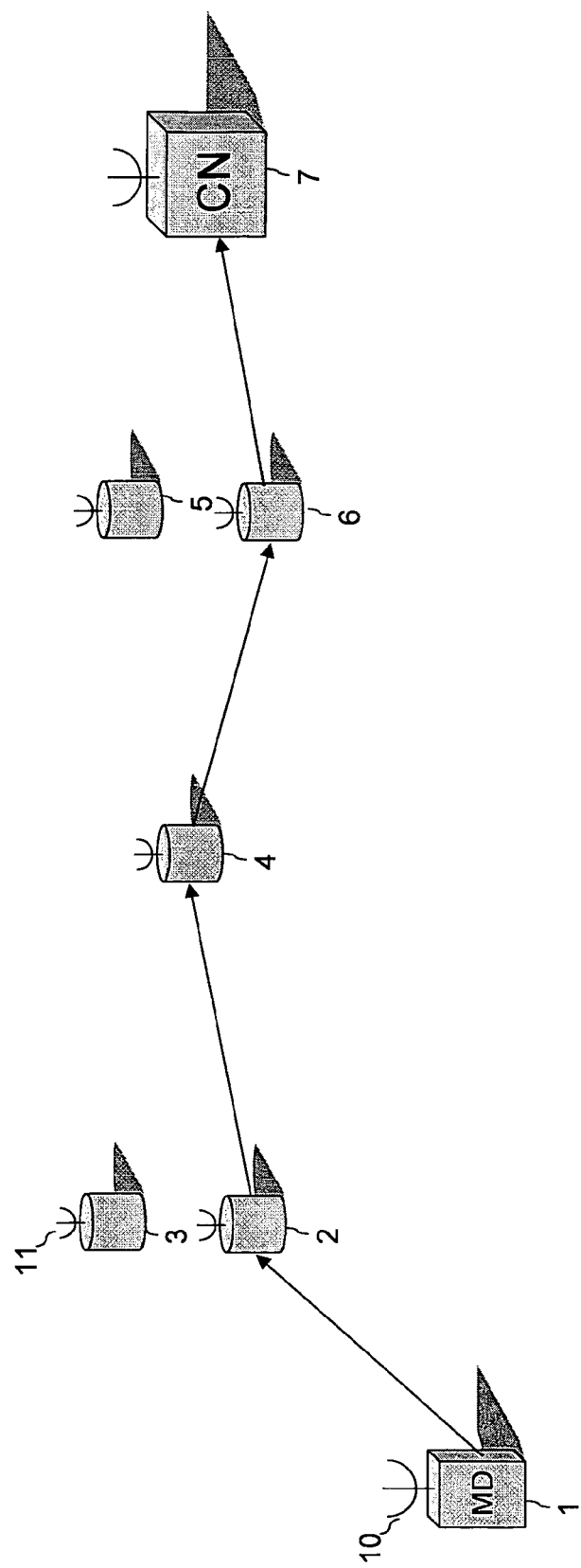
FIG. 1 provides a simplified diagram of upstream data transmission in a network according to the an embodiment of present invention.

FIG. 1 provides a diagram of a simplified network according to an embodiment of the present invention. A mobile device (MD) 1 communicates data to and from a control node 7 via a plurality of repeater nodes 2, 3, 4, 5, 6. In some embodiments the repeater nodes and the control node 7 form part of a self organising ad-hoc network. When the network is first established each repeater node is operable to identify a parent repeater node that is within a communication range and is disposed between it and the control node 7. When the network is operational, the repeater node transmits upstream data to the parent repeater node. In some embodiments, as will be discussed below, the mobile device 1 is operable to select a repeater node within a communication range and transmit upstream data to that selected repeater node. The selected repeater node then transmits the data it has received from the mobile device to its parent repeater node, and the selected repeater node's parent repeater node will transmit the data to its parent repeater node and so on until the data is finally transmitted to the control node 7. As is shown in FIG. 1, the mobile device 1 has selected a first repeater node 2 to which data is to be transmitted. The first repeater node 2 transmits the data to its parent repeater node 4, which in turn transmits the data to its parent repeater-node 6 which transmits the data to the control node 7.

Figure 2:
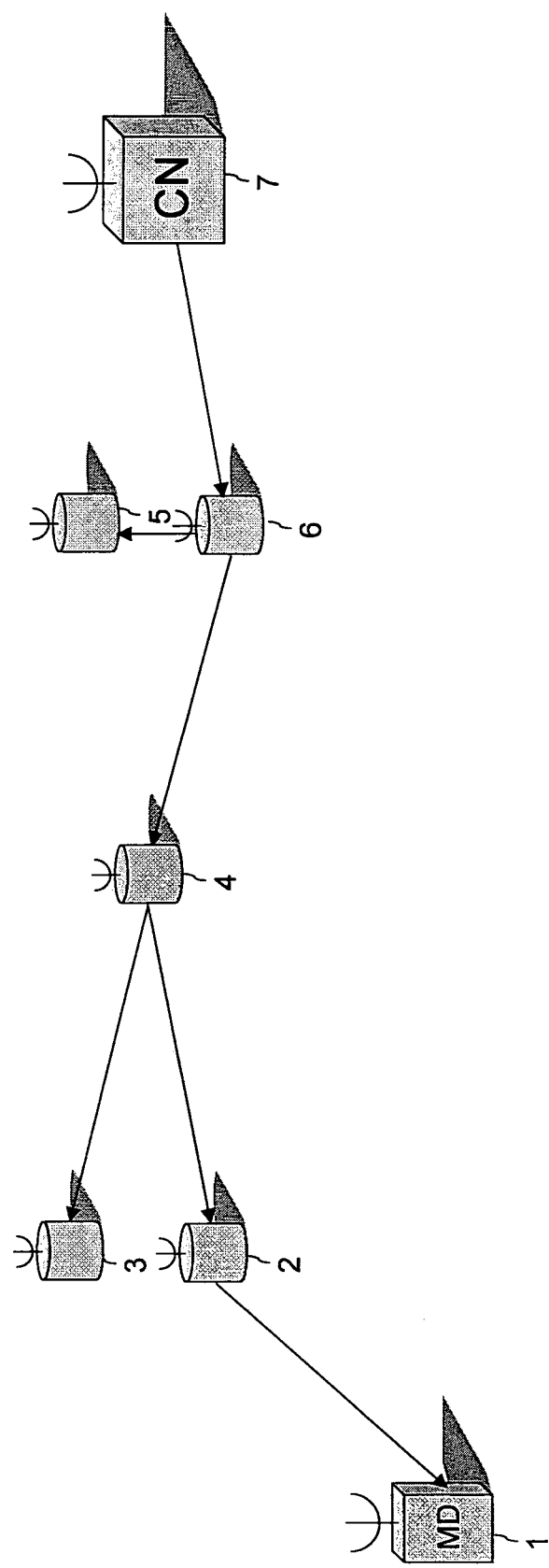
FIG. 2 provides a simplified diagram of downstream data transmission in a network according to the an embodiment of present invention.

FIG. 2 shows an embodiment of the invention in which downstream data is transmitted. The downstream data is transmitted to a first repeater node 6 which transmits the downstream data to a second repeater node 5 and a third repeater node 4. The third repeater node then in turn transmits the data to a fourth repeater node 3 and a fifth repeater node 2. The fifth repeater node 2 then transmits the data to the mobile device 1. In this way the downstream data may be propagated throughout the entire network, regardless of the location of the mobile device. This an effective way of ensuring that, providing the mobile device 1 is in communication range of at least one repeater node the mobile device will always receive the downstream data.

Figure 3:
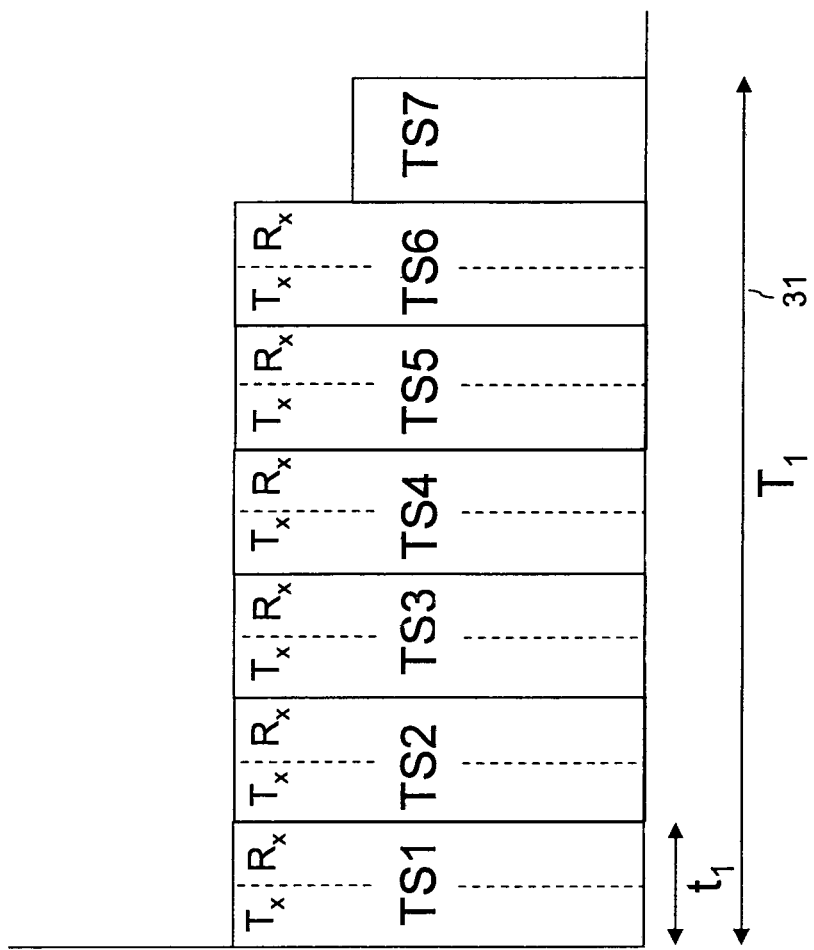
FIG. 3 provides a diagram of a time frame for communicating data in the network of FIG. 1 according to an embodiment of the present invention.

In embodiments of the present invention the communication of data in the network is governed by a time frame. FIG. 3 shows a diagram of a time frame 31 according to which the telecommunications system of FIGS. 1 and 2 communicate upstream data and downstream data. The time frame lasts for a duration of time $T_1$. The control node 7 and the plurality of repeater nodes 2, 3, 4, 5, 6 are each allocated time slots in the time frame 31 which lasts for a period $t_1$. The first repeater node 2 has a corresponding time slot TS1, the second repeater node 3 has a corresponding time slot TS2, the third repeater node 4 has a corresponding time slot TS3 etc. The control node 7 has a corresponding time slot TS6. The time frame 31 includes a reduced power time slot TS7, the purpose of which will be explained shortly. As shown in FIG. 3, each of the time slots TS1 to TS6 include a transmitting half $T_x$ and a receiving half $R_x$. The telecommunication system is arranged such that each repeater node and the control node 7 will transmit downstream data during the transmitting half $T_x$ of their allocated time slot. Upstream data is transmitted by each repeater node during the receiving half $R_x$ of the allocated time slot of the node to which that repeater node is transmitting the upstream data. So for example, in the network shown in FIGS. 1 and 2 the first repeater node 2 will transmit upstream data to the third repeater node 4 during the receiving half $R_x$ of the time slot allocated to the third repeater node 4, i.e. time slot TS3. As shown in FIG. 2 the first repeater node 2 will transmit downstream data during the transmitting half $R_x$ of its allocated time slot TS1. Mobile devices are not allocated a timeslot as they do not transmit data in the downstream direction.

In some embodiments the time frame 31 is ordered such that the time slots corresponding to parts of the telecommunication system that transmit upstream data directly to each other are arranged to be at a minimal time separation. Thus in the telecommunication system of FIG. 1, adjacent parts of the network can be arranged to have correspondingly adjacent time slots. Such an arrangement reduces the transmission in the upstream direction.

In one embodiment, timing for the time frame is achieved in accordance with the IEEE 802.15 standard. System timing is provided by the transmission of timing information in the control node time slot TS6. All repeater nodes derive system timing from data transmitted in the control node time slot TS6 received either directly from the control node 7 or transmitted via other repeater nodes. The period of time over which a time frame occurs may typically be 1 second.

In one example of such a telecommunications network disclosed in our co-pending UK application number 0707924.7, repeater nodes are employed to communicate data between a mobile device and a control node. In order to enable efficient use of a radio interface used by the network, each repeater node is allocated a time slot of a time frame during which to transmit upstream or downstream data. Arranging the network so that it uses a time division multiplex scheme such as this means that the network can operate on one frequency and also provides an arrangement in which transceiver units of the repeater nodes need only transmit data during any one time slot and thus may result in a lower power consumption of the repeater nodes.

Pilot Signal

As mentioned above, the time frame 31 includes a reduced power time slot TS7. During this reduced power time slot all the repeater nodes 2, 3, 4, 5, 6 transmit a pilot signal. The pilot signal is of a reduced power when compared to the power with which data is transmitted by the repeater nodes 2, 3, 4, 5, 6. FIG. 3 shows the time slot TS7 during which the repeater nodes 2, 3, 4, 5, 6 transmit the pilot signal. Each pilot signal transmitted by a repeater node also includes an identifier identifying that repeater node. As shall shortly be explained by arranging the repeater nodes to transmit a reduced power pilot signal at the same time the mobile device is able to determine useful information about its location. This is illustrated by the two examples set out below. In the first example the mobile device uses the pilot signal to assist in handing from one repeater node to another whilst continuing to communicate data. In the second example, the mobile device uses the pilot signal as a location pilot signal for determining a location within the network in which the mobile device is situated.

Handover Pilot Signal

Figure 4:
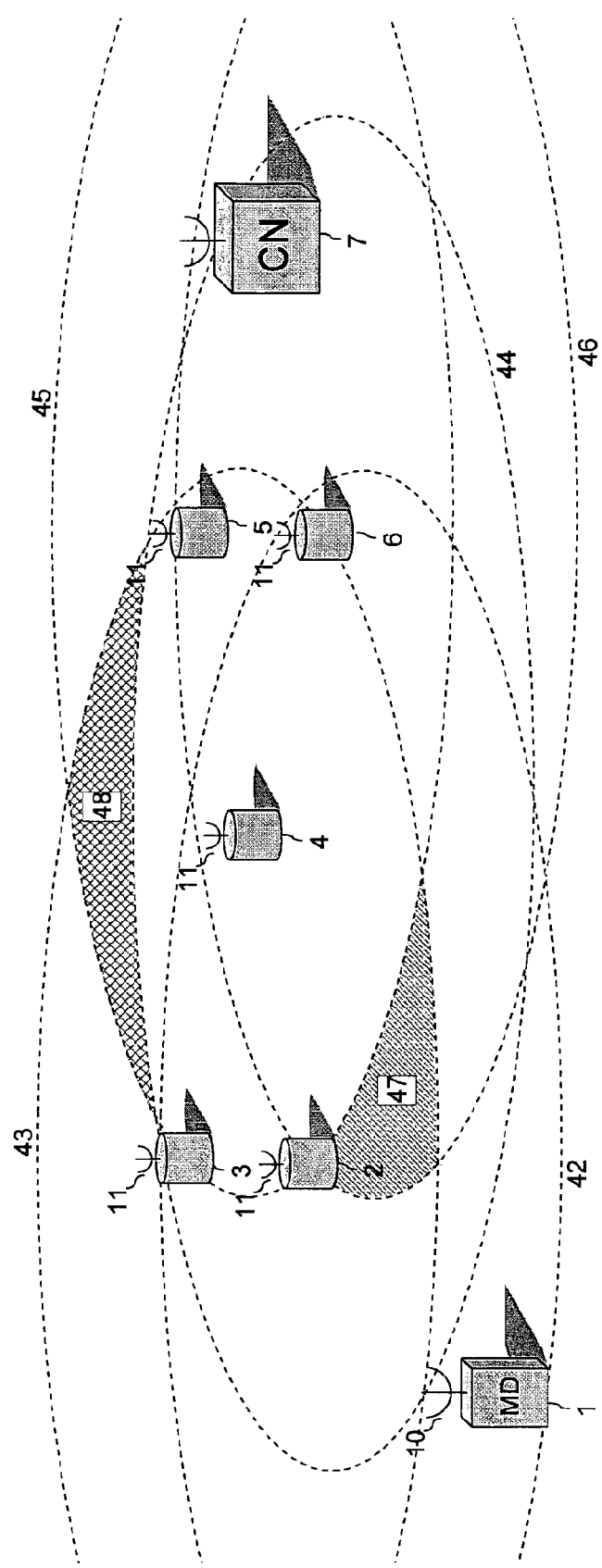
FIG. 4 provides a simplified diagram of coverage areas provided by repeater nodes according to an embodiment of the present invention.

FIG. 4 provides a simplified example of the coverage areas 42, 43, 44, 45, 46 provided by the repeater nodes 2, 3, 4, 5, 6. Each coverage area 42, 43, 44, 45, 46 defines an area within which data can be received by the mobile device 1 when transmitted by the repeater node and received by the repeater node when transmitted by the mobile device 1. This area will be determined by factors such as the power and sensitivity of the transceiver units 11 provided with the repeater nodes 2, 3, 4, 5, 6 and the transceiver unit 10 provided with the mobile device 1. Although not shown in FIG. 4, in some embodiments the coverage area provided by each repeater node is such that it extends across the entire area of the network.

In one embodiment the reduced power pilot signal can be used to provide a handover pilot signal for enabling a mobile device to select a most appropriate repeater node with which to communicate upstream and downstream data. As shown in FIG. 4 the mobile device 1 is in a first coverage area 42 provided by the first repeater node 2. When the mobile device 1 is in the location shown in FIG. 4, it is solely in the first coverage area 42 provided by the first repeater node 2. This means there is no choice but to transmit upstream data from the mobile device via the first control node 2. However, should the mobile device move to a second location within the indicated hashed area 47 then the mobile device 1 will be within the coverage area 42 of not only the first repeater node 2 but a coverage area 44 provided by a second repeater node 4 and a coverage area 46 provided by a third repeater node 6. Similarly should the mobile device move to a third location within the indicated cross hatched area 48 then the mobile device 1 will be within the coverage area 42 of not only the first repeater node 2 but a coverage area 43 provided by a fourth repeater node 3 and a coverage area 44 provided by the second repeater node 6. If the mobile device 1 moves to the second location 47 or the third location 48 then there is more than one potential repeater node to which the mobile device 1 can transmit upstream data.

It can be more efficient from the perspective of radio interference, power consumption and data processing to arrange the network so that the mobile device 1 transmits upstream data to a specific repeater node. Rather than several repeater nodes receiving data from the mobile device 1 and transmitting the data onwards across the network, only one repeater node transmits the upstream data received directly from the mobile device. In addition should a network include several mobile devices, without specifying to which repeater node a mobile device is transmitting data the network may become very inefficient due to excessive radio interference. Furthermore, the power with which the mobile device 1 transmits data need only be sufficient to ensure that it is received by one (most likely the closest) repeater node.

Figure 5:
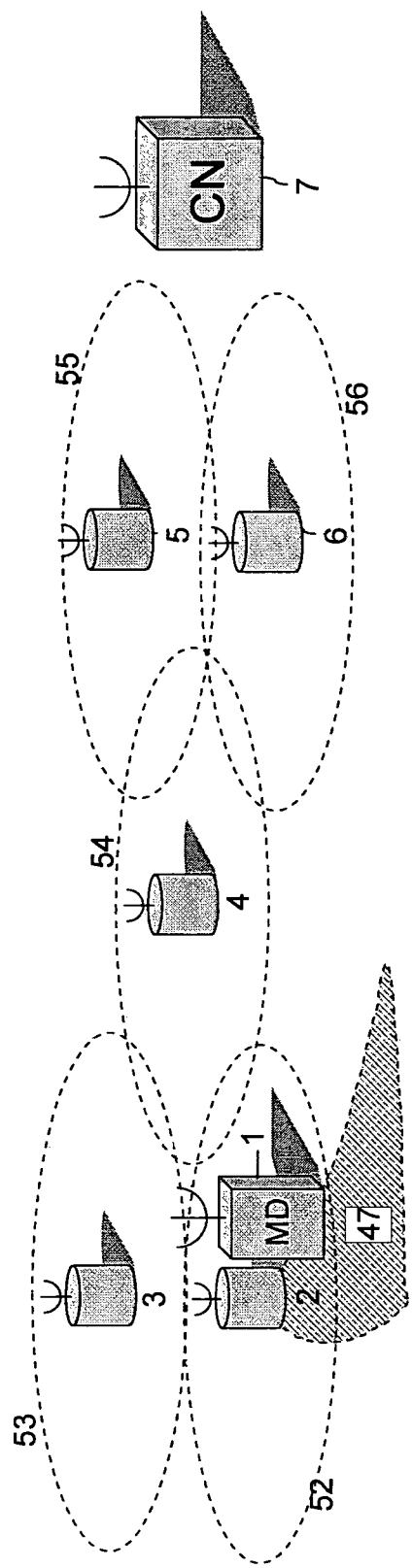
FIG. 5 provides a simplified diagram of reduced power coverage areas provided by repeater nodes according to an embodiment of the present invention.

Therefore, according to an embodiment of the present invention, during the specified pilot signal time slot TS7, all of the repeater nodes 2, 3, 4, 5, 6 transmit a handover pilot signal. As discussed above, the handover pilot signal is of a reduced power when compared to the power with which data is transmitted by the repeater nodes 2, 3, 4, 5, 6. FIG. 5 shows coverage areas 52, 53, 54, 55, 56 provided by the repeater nodes 2, 3, 4, 5, 6 when transmitting at the reduced power. As will be seen when comparing FIGS. 4 and 5, as the coverage area of each repeater node is reduced, the size of areas of the network where there is coverage by more than one repeater node is reduced. The hashed area 47 from FIG. 4 indicating an area of the network within the coverage area 42 of the first repeater node 2, the coverage area 43 provided by a second repeater node 3 and the coverage area 46 provided by the third repeater node 6 is transposed onto FIG. 5 for reference. It can be seen from FIG. 5 that the location of the mobile device 1 is such that during the pilot signal time slot TS7 the mobile device 1 is only in the coverage area 52 provided by repeater node 2. However, as the mobile device 1 is in the hashed area 47, during the remaining parts of the time frame when the repeater nodes are at full transmitting power, the mobile device will be in the coverage areas of at least three repeater nodes.

As can be seen from FIG. 5, because the handover pilot signal is transmitted at a reduced power, the mobile device 1 will only be within a coverage area provided by a repeater node if the mobile device is relatively near the repeater node. As will be understood this makes determining which repeater node is providing the strongest signal to the mobile device 1 much easier to determine. Furthermore, because every repeater node transmits the handover pilot signal at the same time, i.e. during time slot TS7, then the mobile device 1 need only be in a handover pilot signal receiving mode for a period of time equivalent to a time period of the time frame $t_1$. As discussed above when the repeater nodes transmit the handover pilot signal, they are operable to include in the handover pilot signal an identifier. The identifier is different for each repeater node and enables the mobile device to determine which repeater nodes have sent the handover pilot signals which it has received. For example in FIG. 5, the mobile device would be able to determine that it has received a handover pilot signal from the first repeater node 2.

Once the time slot TS7 is complete and the mobile device 1 has received all the handover pilot signals from repeater nodes that are in range, the mobile device 1 is operable to determine from which repeater node it has received the strongest handover pilot signal and select that repeater node as the repeater node to which the mobile device 1 will transmit upstream data and receive downstream data. In the arrangement shown in FIG. 5, the mobile device 1 will select the first repeater node 2. In some embodiments the radio interface used by the network includes a spread spectrum modulation scheme. By use of a spread spectrum scheme detecting the strongest pilot signal at the mobile device is quite simple to achieve. As will be understood, a property of spread spectrum transmission is that stronger signals will tend to suppress the reception of weaker signals by increasing the level of noise across the spectrum (this is also the case for other modulation schemes). Therefore if a repeater node is for example very close to the mobile device 1, the handover pilot signal from that repeater node will not only be stronger but it will also act to suppress the reception of handover pilot signals from other repeater nodes.

In some embodiments the identifier included in the handover pilot signal from each repeater node includes an indication of the time slot which has been allocated to that repeater node of the time frame 31. Therefore in FIG. 1, the mobile device 1 would receive the handover pilot signal from the first repeater node 2 and also an indication that the first repeater node 2 transmits data during the time slot TS1. By including an indication of the time slot, the mobile device may be operable to reduce power consumption further by powering receiving parts of its transceiver unit 10 only during the time slot allocated to the selected repeater node and during the time slot TS7 when the handover pilot signals are transmitted.

During a normal operation it would be expected that the mobile device 1 will move from location to location within the network. Embodiments described above allow for a "seamless handover" from repeater node to repeater node in which the mobile device 1 can change the selected repeater node without any active participation required from the repeater nodes or any other part of the network, such as the control node 7. This is because the mobile device 1 can move from location to location, determining during the handover pilot signal time slot TS7 the repeater node with which it shares the strongest communication link and then activating the receiving parts of its transceiver unit 10 during the time slot allocated to the selected repeater node. This is shown in FIG. 6.

Figure 6:
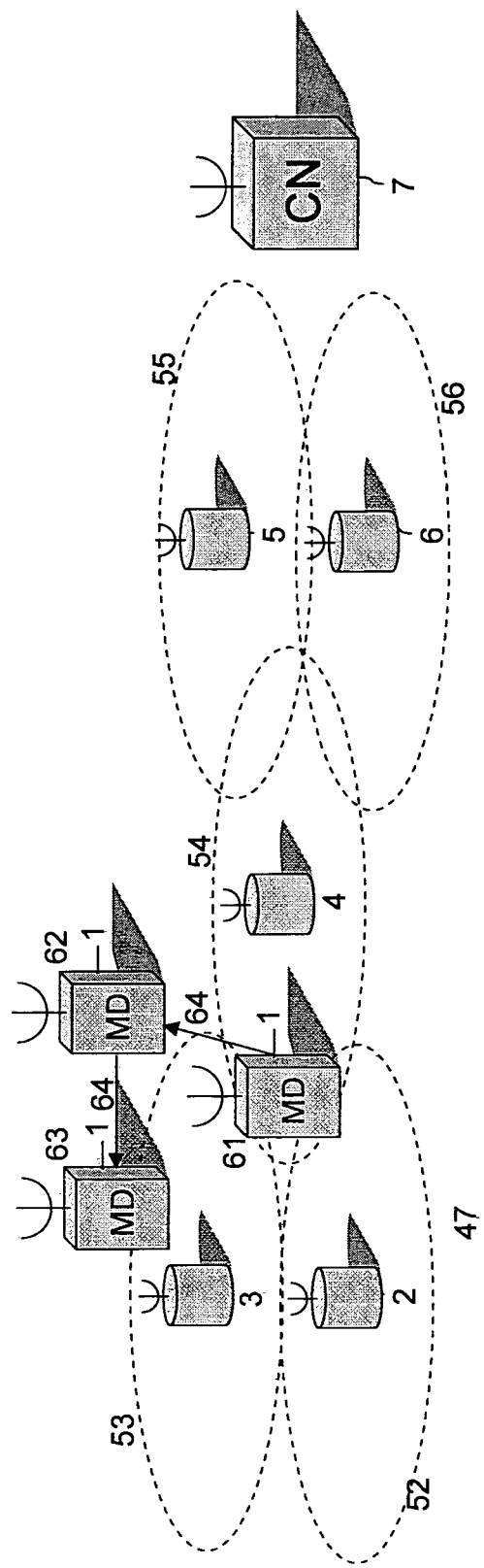
FIG. 6 shows the diagram of FIG. 5 including an illustration of a path taken by a mobile device.

FIG. 6 shows the network in FIG. 5 but including a path 64 which the mobile device takes through the network. A first point 61, a second point 62 and a third point 63 are shown indicating the location of the mobile device 1 during pilot signal timeslots TS7 of the time frame 31. At the first point 61 the mobile device is in the pilot coverage areas of the first repeater node 2 and the third repeater node 4. Therefore during the pilot signal time slot TS7 the mobile device 1 will receive pilot signals from both the first repeater node 2 and the third repeater node 4 and will select whichever repeater node provides the strongest signal. At the second point 62 the mobile device is not in any handover pilot signal coverage area. In such situations, in some embodiments the mobile device 1 will simply continue to use the most recently selected repeater node. In the example shown in FIG. 6 this will be either the first repeater node 2 or the second repeater node 4. At the third point 63 the mobile device 1 is only in the handover pilot signal coverage area 53 of the second repeater node 3 and will therefore select this repeater node.

Location Pilot Signal

Figure 7:
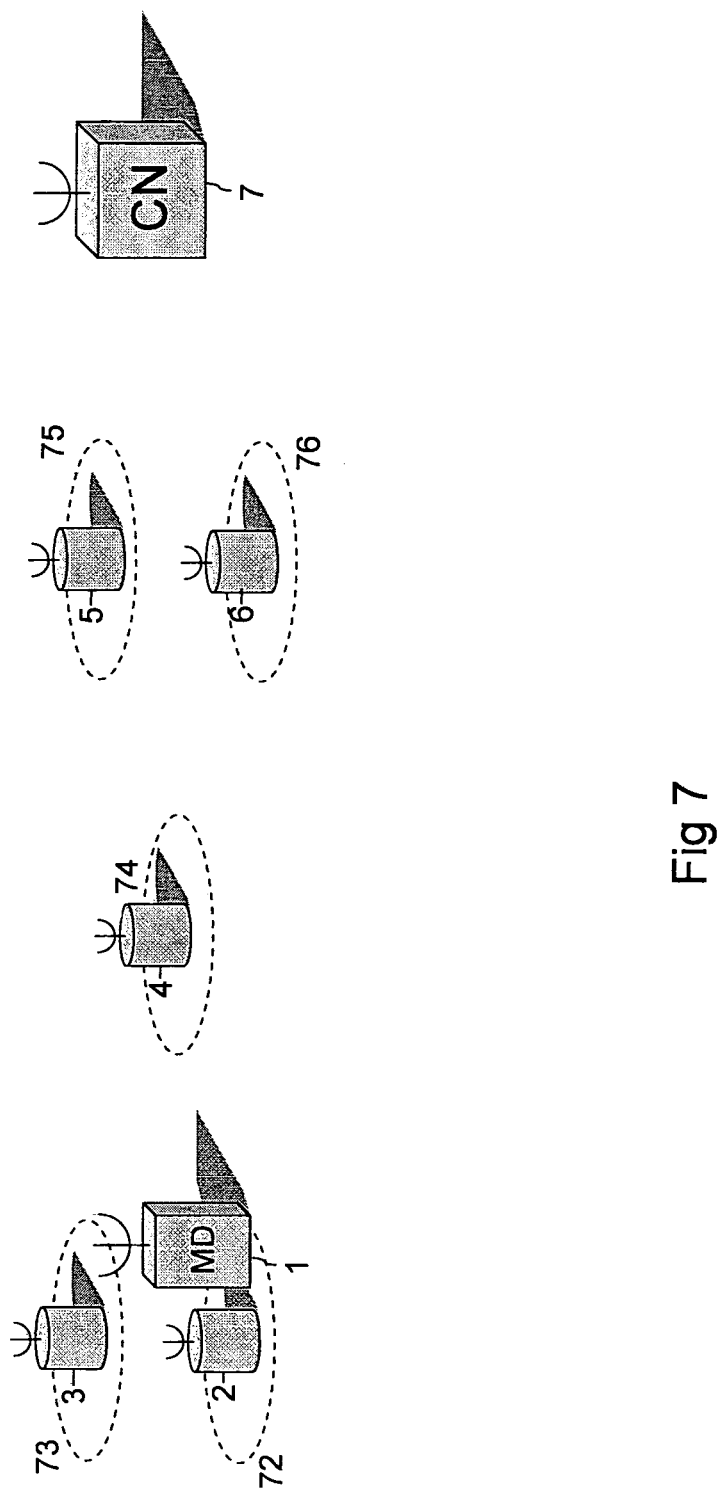
FIG. 7 provides a simplified diagram of further reduced power coverage areas provided by repeater nodes according to an embodiment of the present invention.

In one embodiment the reduced power pilot signal can be used to provide a location pilot signal which is transmitted at a reduced power which is typically reduced further than that of the handover pilot signal. FIG. 7 shows coverage areas 72, 73, 74, 75, 76 provided by the repeater nodes 2, 3, 4, 5, 6 when transmitting the location pilot signal.

Figure 8:
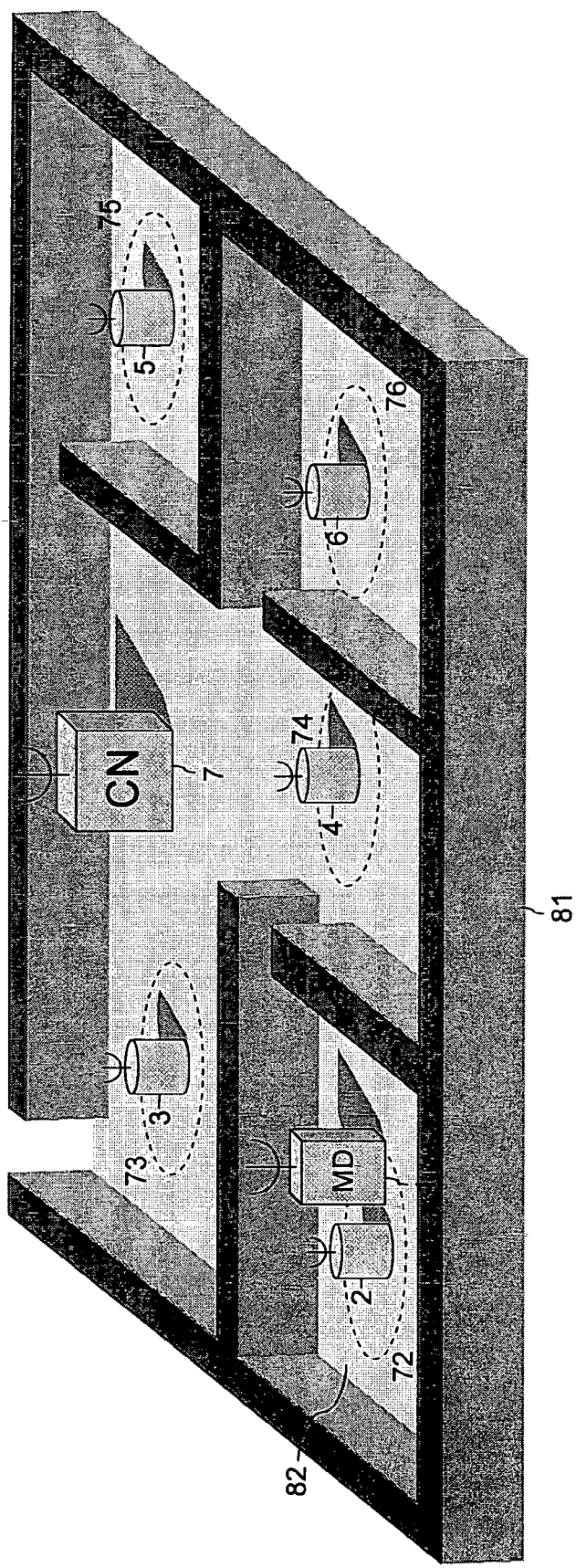
FIG. 8 shows a simplified diagram of finisher reduced power coverage areas provided by repeater nodes whilst the repeater nodes are distributed throughout a building.

As shown in FIG. 7, the transmission of the location pilot signal at the further reduced power is such that there will be little or no substantial overlap between the coverage areas 72, 73, 74, 75, 76 of the repeater nodes 2, 3, 4, 5, 6. If the transceiver unit 10 of the mobile device 1 can receive a location pilot signal transmitted from a repeater node, this indicates that the mobile device 1 is within a coverage area provided by a repeater node transmitting at the further reduced power. The system can therefore use this to determine a location of the mobile device 1. Thus there are two power settings which correspond to the purpose for which the pilot signal is transmitted, namely the handover pilot signal and the location pilot signal. For example as shown in FIG. 8, the repeater nodes 2, 3, 4, 5, 6, might be distributed throughout a building 81 with each repeater node being placed in a separate room. The repeater nodes may be associated with the specific room in which they are located for example the first repeater node 2 could be in a kitchen 82. As illustrated in FIG. 8, because the mobile device is within a coverage area 72 of the location pilot signal of the first repeater node 2 this indicates that the mobile device 1 is in the kitchen. The mobile device 1 may then be operable to send a message to the control node via the repeater nodes indicating that it is presently in the kitchen. The mobile device 1 may make other uses of the location pilot signal for example displaying a message on a display incorporated into the mobile device indicating the location associated with the repeater node which in the example illustrated in FIG. 8 might be "KITCHEN".

As can be seen from FIG. 8, there are areas of the building 81 in which there is no coverage provided by the location pilot signals of any of the repeater nodes. In some embodiments if the mobile device 1 were to move from the coverage area 72 provided by the first repeater node 2 to an area where there is no coverage the mobile device 1 would be operable to send a message back to the control node indicating the mobile device has moved out of the coverage area of any location pilot signals and the last received location pilot signal was from the first repeater node 2.

Figure 9:
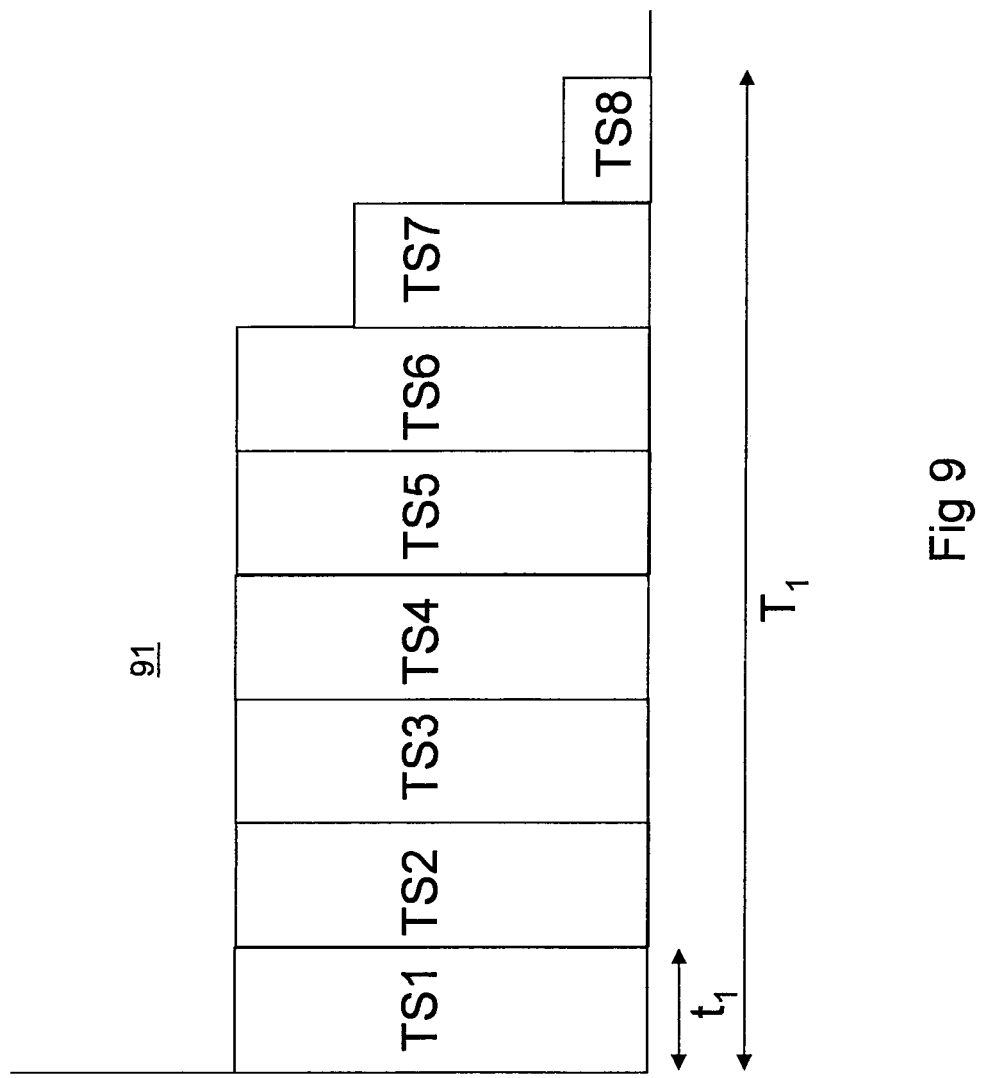
FIG. 9 shows a diagram of a time frame for communicating data in the network of FIG. 1 including both a handover pilot signal and a location pilot signal according to an embodiment of the present invention.

In one embodiment, the time frame and repeater nodes may be arranged so that the time frame includes both a location pilot signal and a handover pilot signal. FIG. 9 shows an example of a time frame for the network shown in FIGS. 1 and 2 including time slot TS7 during which all the repeater nodes transmit a reduced power handover pilot signal and a time slot TS8 during which all the repeater nodes transmit a location pilot signal at a further reduced power. In this embodiment the mobile device determines from any received handover pilot signals a repeater node with which to communicate data and uses a location pilot signal to determine its location.

Figure 10:
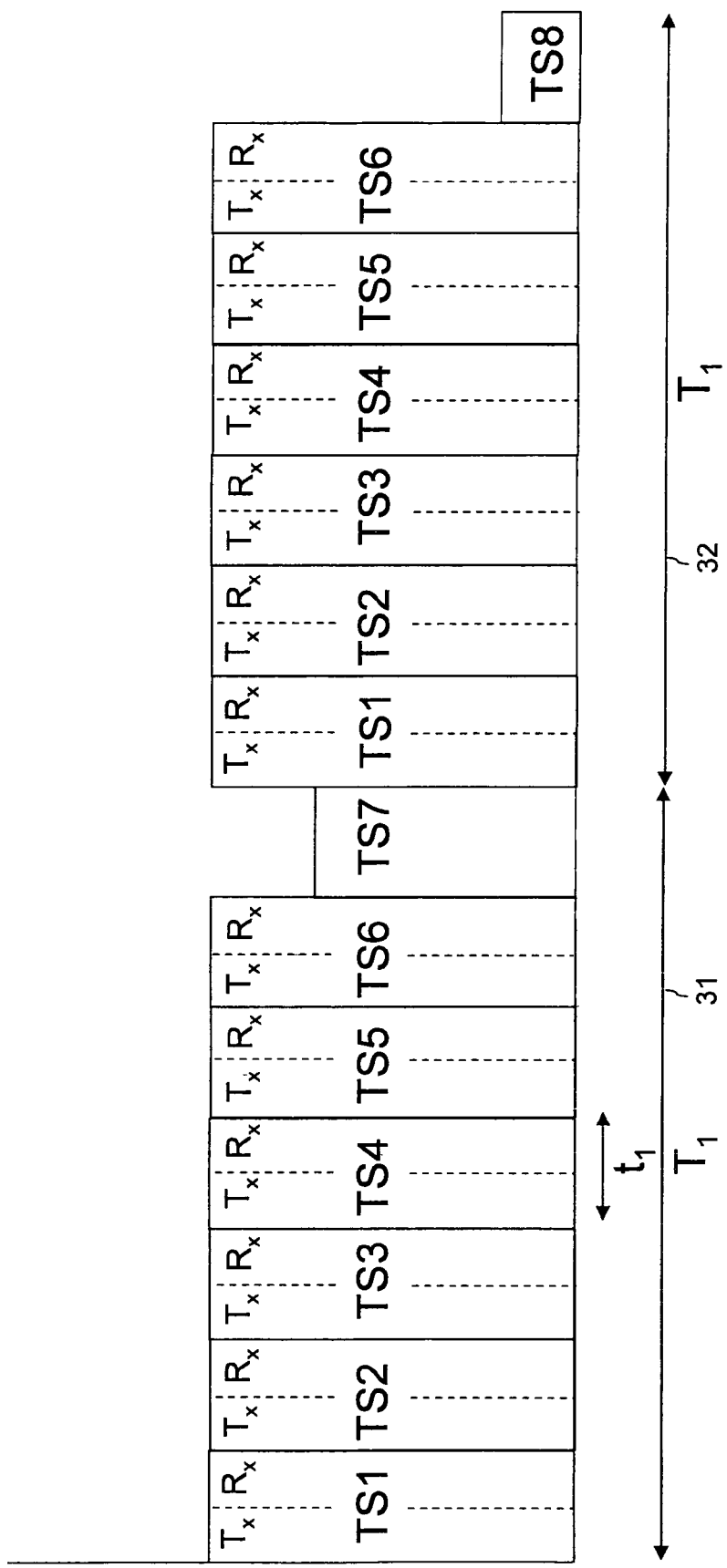
FIG. 10 shows a diagram of two consecutive time frames for communicating data in the network of FIG. 1 including a handover pilot signal in a first time frame and a location pilot signal in a second time frame.
Figure 11:
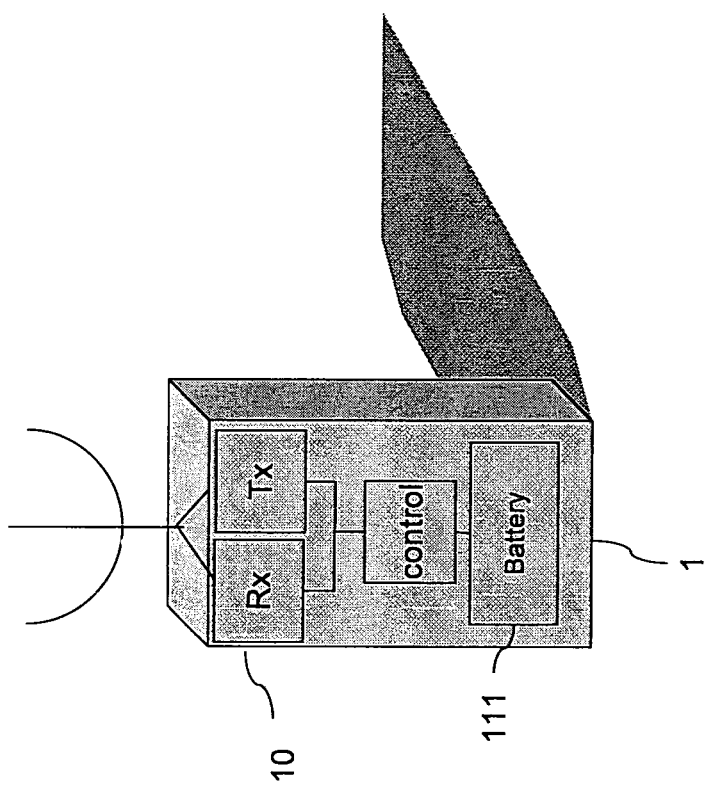
FIG. 11 shows a mobile device e with a more detailed view of the transceiver units and showing a battery.

In another embodiment the repeater nodes are arranged so that each of the repeater nodes alternate between transmitting the pilot signal with the second transmission power and transmitting the pilot signal with the third transmission power between consecutive time frames. FIG. 10 shows an example of a time frame for the network shown in FIGS. 1 and 2 including time slot TS7 in a first time frame 31 during which all the repeater nodes transmit a reduced power handover pilot signal and a second time frame 32 including time slot TS8 during which all the repeater nodes transmit a location pilot signal at a further reduced power. In some cases this embodiment may be preferred over that shown in FIG. 9 as there only need be one time slot allocated for the pilot signal.

Figure 12:
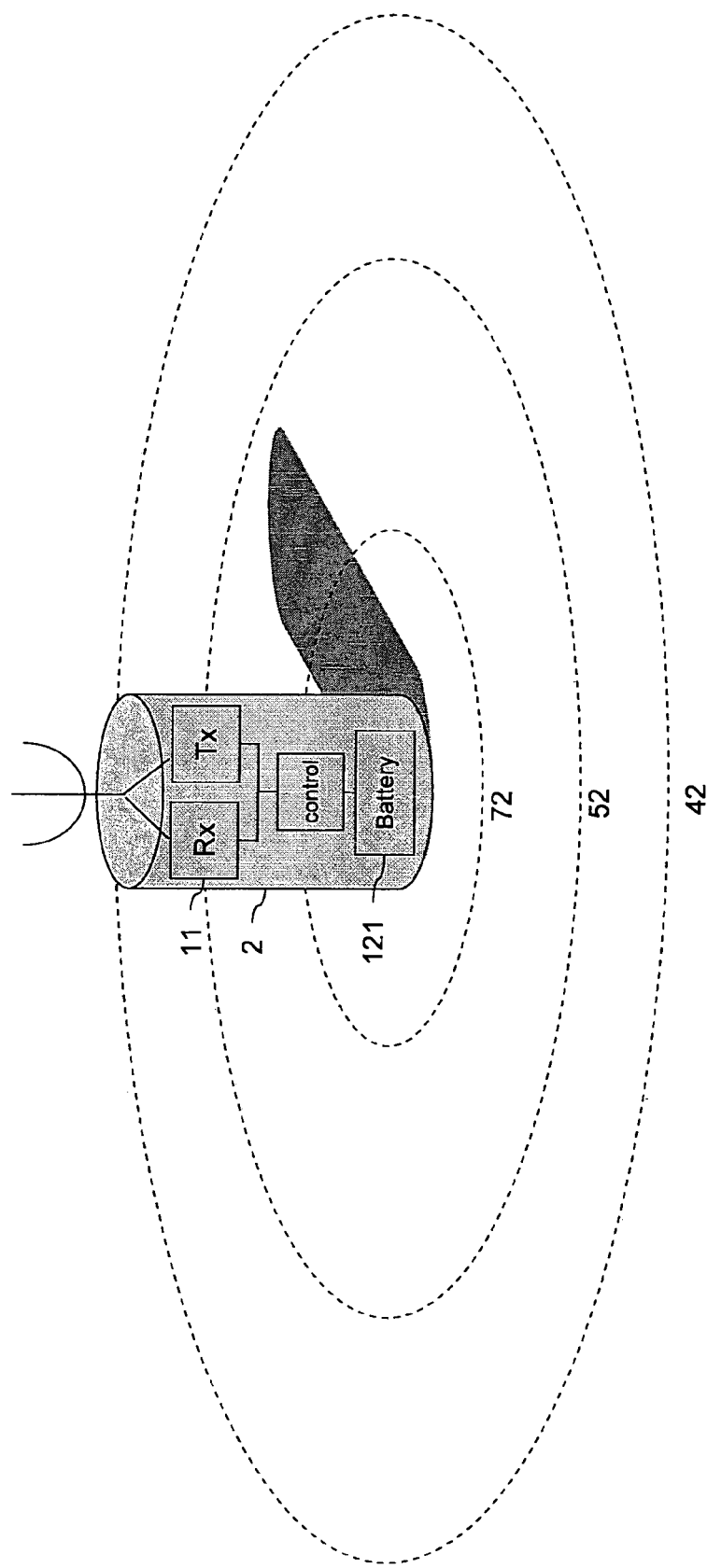
FIG. 12 shows a repeater node with a more detailed view of the transceiver unit and showing a battery.

As shown in FIG. 12, in some embodiments the repeater nodes are battery powered. Preferably, batteries are used to avoid the additional cost and difficulty of running power cables around a site where the repeater nodes are located. The location determining function of the network would typically require very little battery power such that the battery in the mobile device would typically last in excess of 1 year before needing replacement and the battery in the repeater nodes would typically last in excess of 2 years. This is accomplished by using low power radio devices based on utilisation of the IEEE 802.15.4 standard (to which reference is directed) in both the mobile location device and the base station.

In other example embodiments there is provided a location tracking system operating on at least one radio communication channel and comprising a number of fixed base station transmitter/receivers giving full radio coverage over a site with defined boundaries by means of individual base station synchronised time spaced main beacon signals and limited coverage by means of simultaneously transmitted location beacon signals and operable to transmit both main and location beacon signals under the control of a network coordinator unit and also comprising one or more mobile location devices operating within the coverage area and capable of receiving main and location beacon signals from one or more of the fixed base station transmitters in order to gain synchronism and determine location and in turn transmitting a location signal to identify the position of the respective mobile location device within the coverage area.

As an alternative, the repeater nodes could be powered from the local AC mains power supply via a power adaptor so as to avoid the need to replace batteries periodically.

In one embodiment an implementation for the repeater node and mobile device could use a low power radio transceiver with inbuilt microcontroller such as the Chipcon CC2430 IEEE 802.15.4. With this device supporting an implementation with a time frame interval $T_1$ of one second and up to 100 repeater nodes per one second interval, a repeater node would consume approximately 0.5 mA and the mobile device approximately 0.2 mA. If the repeater nodes operated from two alkaline D cells, having a capacity of 18 Ah, they might typically run for three years. If the mobile device operated from two alkaline AA cells, having a capacity of 2 Ah, the mobile device might typically run for one year. In one embodiment in which a repeater node uses a Chipcon CC2430, there is used a matching network to convert the balanced antenna interface of the CC2430 to an unbalanced 50 ohm co-axial connector. The CC2430 contains all of the circuitry for running the repeater node software and radio, with data transmission being generated by the same CC2430 hardware.

Various modifications may be made to the embodiments herein before described. For example, each Mobile Location Device may also be a personal alarm and/or a pager. Also, the Mobile Location Device may provide alarms on movement and/or location based theft detection of equipment.

The invention claimed is:

1. A telecommunications system for communicating data to and from a mobile device, the system comprising a plurality of repeater nodes and a control node disposed to form a network, each repeater node having a transceiver unit operable to transmit the data with a first transmission power to one or more others of the repeater nodes within one of a plurality of time slots of a time frame, each repeater node being allocated one of the time slots of the time frame by the control node to transmit and receive data to and from the mobile device, wherein each of the repeater nodes is operable to transmit a pilot signal during a same one of the time slots of the time frame on a same frequency channel with a second transmission power, the second power being less than the first transmission power, the pilot signal including an identifier of the repeater node which transmitted the pilot signal, and the mobile device is operable to receive one of the pilot signals transmitted from one of the repeater nodes, to detect the identifier included in the pilot signal received from the one repeater node for identifying the location of the mobile device, and to transmit a message to the one repeater node in the one of the time slots of the time frame.

2. A telecommunications system according to claim 1, wherein the second transmission power is sufficient to ensure that the mobile device can receive the pilot signal from at least one of the repeater nodes when operating within the network.

3. A telecommunications system according to claim 1, wherein the pilot signal transmitted by each repeater node includes an indication of the time slot of the time frame used by the repeater node to transmit the data.

4. A telecommunications system according to claim 1, wherein the mobile device is operable to receive the pilot signal from the one repeater node and from the identifier included in the received pilot signal to transmit data to the repeater node identified by the identifier.

5. A telecommunications system according to claim 4, wherein the mobile device is configured to transmit the identifier in the message to the one repeater node in the time slot of the time frame identified by the one repeater node from information in the received pilot signal.

6. A telecommunications system according to claim 5, wherein one of the repeater nodes of the telecommunications system is configured as a control node, and the control node is configured to receive the identifier transmitted by the mobile device from the one repeater node, and to identify the location of the mobile device from the received identifier.

7. A telecommunications system according to claim 1, wherein the mobile device is configured
to determine, from the identifier included in the received pilot signal and a location associated with the repeater node, a relative location of the mobile device.

8. A telecommunications system according to claim 1, wherein
if the mobile device does not receive the pilot signal during the same one of the time slots during which the repeater nodes transmit the pilot signal, the mobile device is operable to select a repeater node in accordance with the repeater node which the mobile device last received the pilot signal.

9. A method of communicating data to and from a mobile device in a network which includes a plurality of repeater nodes and a control node, the method comprising
transmitting the data from each of the repeater nodes with a first transmission power to one or more others of the plurality of repeater nodes within one of a plurality of time slots of a time frame, each repeater node being allocated a different time slot of the time frame by the control node,
transmitting a pilot signal from each repeater node during a same one of the time slots of the time frame on a same frequency channel with a second transmission power, the second power being less than the first transmission power, the pilot signal including an identifier of the repeater node which transmitted the pilot signal,
receiving, at the mobile device, one of the pilot signals transmitted from one of the repeater nodes,
detecting the identifier included in the pilot signal received from the one repeater node for identifying the location of the mobile device, and
transmitting a message to the one repeater node in the one of the time slots of the time frame.

10. A method according to claim 9, wherein
the second transmission power is sufficient to ensure that the mobile device can receive the pilot signal from at least one of the repeater nodes when operating within the network.

11. A method according to claim 9, wherein
each pilot signal includes an indication of the time slot of the time frame allocated to the repeater node which transmits the pilot signal.

12. A method according to claim 9, wherein the
receiving at the mobile device the pilot signal from the one repeater node, includes
determining a repeater node to transmit data to, from the repeater node identified by the identifier included in the received pilot signal.

13. A method according to claim 9, wherein
if the mobile device does not receive the pilot signal during the same one of the time slots during which the repeater nodes transmit the pilot signal, the mobile device is operable to select a repeater node in accordance with the repeater node which the mobile device last received the pilot signal.

14. A method according to claim 10, wherein
each pilot signal includes an indication of the time slot of the time frame allocated to the repeater node which transmits the pilot signal.

15. A method according to claim 9, further comprising
transmitting from the mobile device the identifier in the message to the one repeater node in the time slot of the time frame identified by the one repeater node from information in the received pilot signal.

16. A method according to claim 15, further comprising
configuring one of the repeater nodes of the telecommunications system as a control node,
receiving at the control node the identifier transmitted by the mobile device from the one repeater node, and
identifying the location of the mobile device from the received identifier.

17. A repeater node for communicating data in a telecommunications system, the repeater node comprising
a transceiver unit operable to transmit and receive data to or from one or more others of a plurality of repeater nodes and a mobile device within one of a plurality of time slots of a time frame allocated to the repeater node by a control node, wherein
the transceiver unit is operable to transmit the data with a first transmission power to the one or more of the repeater nodes within the one of a plurality of time slots of the time frame,
the transceiver unit is operable to transmit a pilot signal during a second time slot of the time frame with a second transmission power, the second power being less than the first transmission power, the pilot signal including an identifier of the repeater node which transmitted the pilot signal, and
the transceiver unit is operable to receive a message from the mobile device within the one of the time slots of a time frame, the message indicating a location of the mobile device.

18. A repeater node according to claim 17, wherein
the repeater node includes a battery power source.

19. A mobile device for communicating data in a telecommunications system, the mobile device comprising
a transceiver unit operable to transmit and receive data to or from one or more of a plurality of repeater nodes, wherein
the transceiver unit is operable to transmit the data to one of the repeater nodes within one of a plurality of time slots of a time frame allocated to the repeater node by a control node,
the transceiver unit is operable to receive a pilot signal from one of the repeater nodes during a second time slot of the time frame, the pilot signal including an identifier of the repeater node which transmitted the pilot signal, and the mobile device is operable
to detect the identifier included in the pilot signal received from the one repeater node for identifying the location of the mobile device, and
the transceiver unit is operable
to transmit a message to the one repeater node in the one of the time slots of the time frame.

20. A mobile device according to claim 19, wherein
the repeater node includes a battery power source.

21. A mobile device according to claim 19, wherein the transceiver unit is operable
to transmit the message to the one repeater node within the one of the plurality of the time slots, the message indicating a location of the mobile device, the location of the mobile device being determined based on the identifier included in the received pilot signal.

22. A mobile device according to claim 21, wherein the mobile device is configured to transmit the identifier in the message to the one repeater node in the time slot of the time frame identified by the one repeater node from information in the received pilot signal.

23. A mobile device according to claim 19, wherein the mobile device is configured to determine, from the identifier included in the received pilot signal and a location associated with the repeater node, a relative location of the mobile device.

* * * * *